United States Patent [19]
Matzek et al.

[11] 3,883,644
[45] May 13, 1975

[54] ALUMINUM HYDRIDE

[75] Inventors: Norman E. Matzek, Midland; Donald F. Musinski, Bay City, both of Mich.

[73] Assignee: The Dow Chemical Company, Midland, Mich.

[22] Filed: Oct. 23, 1962

[21] Appl. No.: 234,277

[52] U.S. Cl. .................. 423/645; 149/76; 149/87
[51] Int. Cl. ............................................ C01b 6/00
[58] Field of Search.................. 23/204; 423/645

[56] References Cited
UNITED STATES PATENTS
3,092,648   6/1963   Koster............................ 23/204 X

OTHER PUBLICATIONS

Chizinsky et al., J. Am. Chem. Soc. 77, 3,164–3165, (1955).
Finholt et al., J. Am. Chem. Soc. 69, 1,199–1201, (1947).
Rice, Non-Solvent Aluminum Hydride, P.B. Report 127, 867, Aug. 1, 1956, pp. 1–8.

Primary Examiner—Carl D. Quarforth
Assistant Examiner—F. M. Gittes
Attorney, Agent, or Firm—C. Kenneth Bjork

[57] ABSTRACT

The invention relates to a novel, crystalline substantially non-solvated aluminum hydride having a unique X-ray diffraction.

1 Claim, 1 Drawing Figure

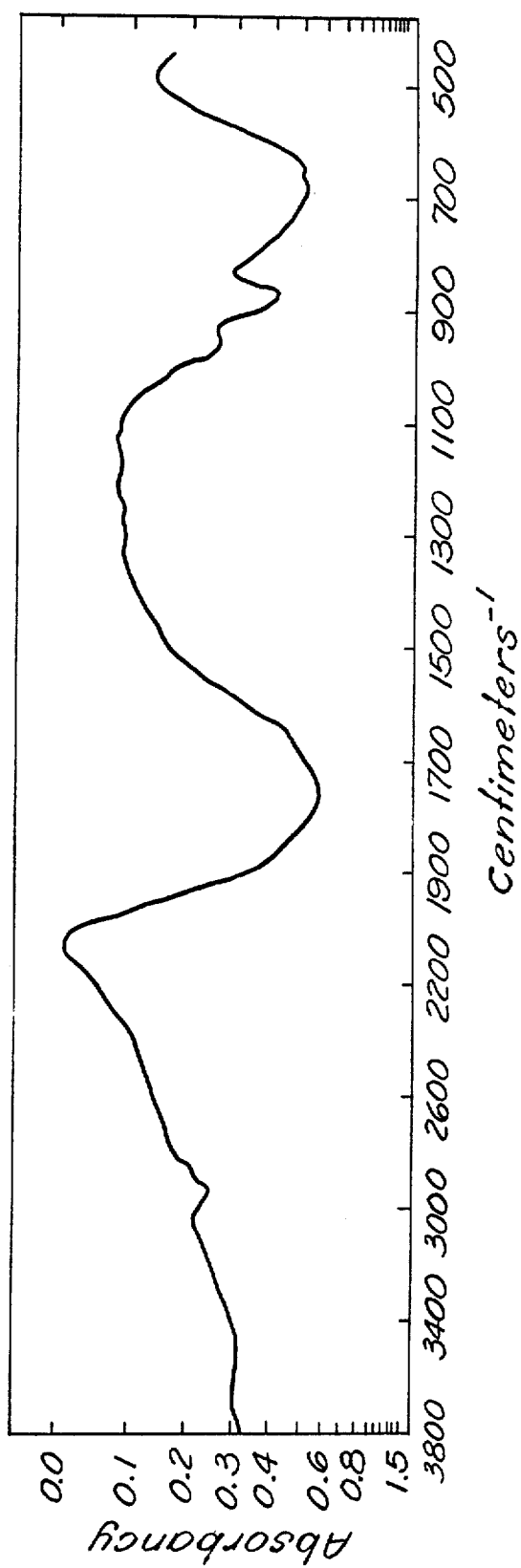

ALUMINUM HYDRIDE

This invention relates to a novel composition, and more particularly, to a novel composition of aluminum hydride.

Heretofore, by traditional methods of preparation a stable form of solid aluminum hydride has not been isolated. Generally from the ordinary methods of manufacturing, a solvated aluminum hydride in ether is obtained. This product is in a combined form with the ether, forming an etherate, from which it is very difficult to separate the aluminum hydride. Heating of the compound does not effect a separation. Before the aluminum hydride can be freed of the ether, it will decompose.

Certain specific, peculiar non-solvated forms of aluminum hydride have been disclosed in our copending application, Ser. No. 179,509, filed Mar. 8, 1962.

Now we have discovered a novel aluminum hydride composition (hereinafter designated as alpha'aluminum hydride or $\alpha'$-aluminum hydride) having a good stability against degradation upon storage and which possesses unique and structural characteristics distinctly different from aluminum hydride compositions reported heretofore.

It is, therefore, a principal object of this invention to provide a novel, stable form of solid, substantially non-solvated aluminum hydride. The density of this novel hydride is about 1.3 grams per cubic centimeter. The product is insoluble or sparingly soluble in diethyl ether but is soluble in tetrahydrofuran. It is relatively inert to hydrazine and hydrolyzes slowly in presence of water. This product has a unique infrared spectrum and X-ray powder pattern which indicates that it possesses a unique crystal structure distinctly different from the aluminum hydrides reported heretofore.

The novel composition conveniently can be prepared by desolvation and conversion of a freshly prepared ether solvated aluminum hydride. It is generally preferred to prepare the solvated material just prior to the treatment of this material for the desolvation and conversion to the novel composition. In the preparation of the solvated material generally aluminum chloride is reacted with a molar excess of lithium aluminum hydride in diethyl ether diluent in an inert atmosphere. The resulting solution is filtered and the ether removed from the filtrate. The resulting dry solid aluminum hydride product is heated under reduced pressure at a temperature of from about 40° to about 100° C., and preferably at about 40° C. for an extended period of time; i.e. from about 24 to about 96 hours or more.

Generally pressures of from less than about 0.1 to about 100 millimeters mercury are employed for the final heating of the solid product.

After the heat treatment, the $\alpha'$-aluminum hydride product is washed with an inert solvent to remove any residual complex hydride which may be present.

The following Example further illustrates the preparation of the novel compound and its utility.

EXAMPLE I

In a flask, about 0.10 mole (13.33 grams) of aluminum chloride was reacted with about 0.4 mole (15.05 grams) of lithium aluminum hydride in a diethyl ether solvent under a nitrogen atmosphere. The aluminum chloride was dissolved in the diethyl ether and then added to the lithium aluminum hydride as the mixture was being agitated. The mixture was stirred for about 2 minutes after which the lithium chloride formed by the reaction was removed by filtration. The ether was removed from the filtrate by vaporization under a pressure of approximately 10 millimeters of mercury. The mixture of aluminum hydride etherate and the unreacted lithium aluminum hydride thus obtained was transferred to a stirrer-equipped flask and placed in a temperature controlled bath and heated at a temperature of about 40° C. for about 70 hours. During this period, the pressure within the system was maintained at about $1 \times 10^{-4}$ millimeter mercury absolute.

After the heat treatment, the sample was washed with diethyl ether to remove any complex hydride therefrom. The X-ray powder diffraction pattern of the resulting $\alpha'$-aluminum hydride was as follows:

Table 1

X-ray Powder Diffraction Data of Alpha'-Aluminum Hydride

| d | I/I₁ | d | I/I₁ |
|---|---|---|---|
| 5.6 | 100 | 1.44 | 5 |
| 3.28 | 60 | 1.41 | 12 |
| 3.21 | 10 | 1.395 | 5 |
| 2.79 | 60 | 1.281 | 6 |
| 2.29 | 12 | 1.271 | 2 |
| 2.12 | 50 | 1.144 | 5 |
| 1.855 | 3 | 1.123 | 0.8 |
| 1.77 | 3 | 1.090 | 0.8 |
| 1.635 | 7 | 1.060 | 2 |
| 1.61 | 8 | 1.045 | 0.8 |
| 1.60 | 8 | 1.015 | 3 |
| 1.57 | 3 | 1.004 | 0.8 |
| 1.54 | 2 | | |

In the above table $d$ represents the interplanar spacings of the planes in A based upon Miller indices and $I/I_1$ is the relative line intensity compared to the strongest line based at 100.

The infrared spectrum of this novel alpha'-aluminum hydride is given in the FIGURE. Significant absorption maxima in this spectrum for the composition are found at 640 cm⁻¹, 680 cm⁻¹, 870 cm⁻¹, 955 cm⁻¹, 1,020 cm⁻¹, 1,650 cm⁻¹ and 1,760 cm⁻¹.

The density of the disclosed and claimed composition was found to be about 1.3±0.04 grams/cubic centimeter.

The alpha'-aluminum hydride, a white solid, was substantially insoluble or only sparingly soluble in diethyl ether. It was soluble in tetrahydrofuran and was inert to hydrazine. On exposure to water it hydrolyzed very slowly, requiring hours for complete hydrolysis. The material successfully was stored at room temperature for months.

The $\alpha'$-aluminum hydride can be used as a fuel in a solid rocket propellant by intermixing it with ammonium perchlorate and a suitable binder to form a solid propellant. The propellant fires satisfactorily. The calculated specific impulse from such a firing is found to be in the range of 295 to 300.

We claim:

1. A novel, crystalline substantially non-solvated aluminum hydride having the unique X-ray diffraction as follows:

| d | I/I₁ | d | I/I₁ |
|---|---|---|---|
| 5.6 | 100 | 1.44 | 5 |
| 3.28 | 60 | 1.41 | 12 |
| 3.21 | 10 | 1.395 | 5 |
| 2.79 | 60 | 1.281 | 6 |
| 2.29 | 12 | 1.271 | 2 |

-Continued

| d | I/I₁ | d | I/I₁ |
|---|---|---|---|
| 2.12 | 50 | 1.144 | 5 |
| 1.855 | 3 | 1.123 | 0.8 |
| 1.77 | 3 | 1.090 | 0.8 |
| 1.635 | 7 | 1.060 | 2 |
| 1.61 | 8 | 1.045 | 0.8 |
| 1.60 | 8 | 1.015 | 3 |
| 1.57 | 3 | 1.004 | 0.8 |
| 1.54 | 2 | | | and an infrared spectrum having significant absorption maxima at 640 cm$^{-1}$, 680 cm$^{-1}$, 870 cm$^{-1}$, 955 cm$^{-1}$, 1,020 cm$^{-1}$, 1,650 cm$^{-1}$ and 1,760 cm$^{-1}$.

* * * * *